US011173603B2

(12) United States Patent
Ooba (10) Patent No.: US 11,173,603 B2
(45) Date of Patent: Nov. 16, 2021

(54) ROBOT SYSTEM AND ROBOT

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 290 days.

(21) Appl. No.: 16/415,243

(22) Filed: May 17, 2019

(65) Prior Publication Data

US 2019/0381657 A1    Dec. 19, 2019

(30) Foreign Application Priority Data

Jun. 15, 2018   (JP) .............................. JP2018-114427

(51) Int. Cl.
    *B25J 9/16*    (2006.01)
(52) U.S. Cl.
    CPC ........... *B25J 9/1664* (2013.01); *B25J 9/1692* (2013.01); *B25J 9/1694* (2013.01)
(58) Field of Classification Search
    CPC ...... B25J 9/1697; B25J 9/0093; B25J 19/023; B25J 15/0616; B25J 9/1664; B25J 9/1694; B25J 9/1692; B25J 9/1628; B25J 13/088; B25J 9/00; G05B 19/4182; G05B 2219/31432; G05B 2219/37555; G05B 2219/39102; G05B 2219/40297; G05B 2219/40557; Y10S 901/09
    See application file for complete search history.

(56) References Cited

U.S. PATENT DOCUMENTS

| 5,040,056 A | 8/1991 | Sager et al. |
| 8,948,916 B2 * | 2/2015 | Ishikawa ................ B25J 9/1694 |
| | | 700/258 |
| 2012/0323357 A1 | 12/2012 | Izumi et al. |
| 2012/0323358 A1 | 12/2012 | Izumi et al. |
| 2012/0323363 A1 | 12/2012 | Izumi et al. |
| 2013/0325180 A1 | 12/2013 | Ishikawa |
| 2013/0329954 A1 * | 12/2013 | Ikeda ................. B23Q 17/2414 |
| | | 382/103 |

(Continued)

FOREIGN PATENT DOCUMENTS

| EP | 2 537 645 A1 | 12/2012 |
| EP | 2537644 A1 | 12/2012 |

(Continued)

OTHER PUBLICATIONS

Hasegawa, Kiyoshi, English translation of JP-61100805-A, May 1986 (Year: 1986).*

(Continued)

*Primary Examiner* — Abby Y Lin
*Assistant Examiner* — Danielle Marie Jackson
(74) *Attorney, Agent, or Firm* — Maier & Maier, PLLC (57) ABSTRACT

This robot system includes a sensor which obtains data for detecting at least a position of an object which is being moved, a robot at which a tool is attached, and which performs a predetermined operation for the object by means of the tool, and a controller which controls a tool moving device which moves the tool with respect to the robot, the tool, or an arm member which is located at a distal end side of an arm of the robot with a tool control cycle which is shorter than a control cycle of the robot.

5 Claims, 6 Drawing Sheets

(56) References Cited

U.S. PATENT DOCUMENTS

2014/0195053 A1    7/2014  Subotincic
2017/0028558 A1*   2/2017  Nishi ..................... B25J 9/1692

FOREIGN PATENT DOCUMENTS

| EP | 2538373 A2 | 12/2012 |
|---|---|---|
| EP | 2 586 575 A1 | 5/2013 |
| EP | 2 586 576 A1 | 5/2013 |
| EP | 2653414 A1 | 10/2013 |
| JP | S61-100805 A | 5/1986 |
| JP | H07-125828 A | 5/1995 |
| JP | H07-227779 A | 8/1995 |
| JP | 2001-239484 A | 9/2001 |
| JP | 2012166308 A | 9/2012 |
| JP | 2013-000855 A | 1/2013 |
| JP | 2013-000861 A | 1/2013 |
| JP | 2013000854 A | 1/2013 |
| WO | 2012108022 A1 | 8/2012 |

OTHER PUBLICATIONS

Japanese Office Action dated Aug. 11, 2020, in connection with corresponding JP Application No. 2018-114427 (9 pp., including machine-generated English translation).

Japanese Search Report dated Jul. 30, 2020, in connection with corresponding JP Application No. 2018-114427 (32 pp., including machine-generated English translation).

\* cited by examiner

ROBOT SYSTEM AND ROBOT

CROSS-REFERENCE TO RELATED APPLICATIONS

This application is based on and claims priority to Japanese Patent Application No. 2018-114427 filed on Jun. 15, 2018, the entire content of which is incorporated herein by reference.

FIELD

This invention relates to a robot system and a robot.

BACKGROUND

Conventionally, there is a known robot system in which a tool provided at a distal end portion of a robot is used to perform a predetermined operation on an object which is moved by a conveyer device. (See PTL 1, Japanese Unexamined Patent Application, Publication No. 2013-000861.)

SUMMARY

A robot system according to a first aspect of the present invention includes a sensor which obtains data for detecting at least a position of an object which is being moved by a moving means for moving the object; a robot to which a tool is attached, and which performs a predetermined operation for the object by using the tool; and a controller which controls, using the data, a tool moving device which moves the tool with regard to the robot, the tool, or an arm member which is located at a distal end side of an arm of the robot with a tool control cycle which is shorter than a control cycle of the robot.

A second aspect of the present invention is a robot including an arm to which a tool is attached, and which performs a predetermined operation by the tool for an object which is being moved by a moving means for moving the object; a sensor which is attached to the arm or the tool, and which obtains data for detecting at least a position of the object which is being moved by the moving means; and a controller which controls, using the data, a tool moving device which moves the tool with regard to the arm, the tool, or an arm member which is located at a distal end side of the arm with a tool control cycle which is shorter than a control cycle of the robot.

DETAILED DESCRIPTION

A robot system according to a first embodiment of the present invention will be described below with reference to the accompanying drawings.

Figure 1:
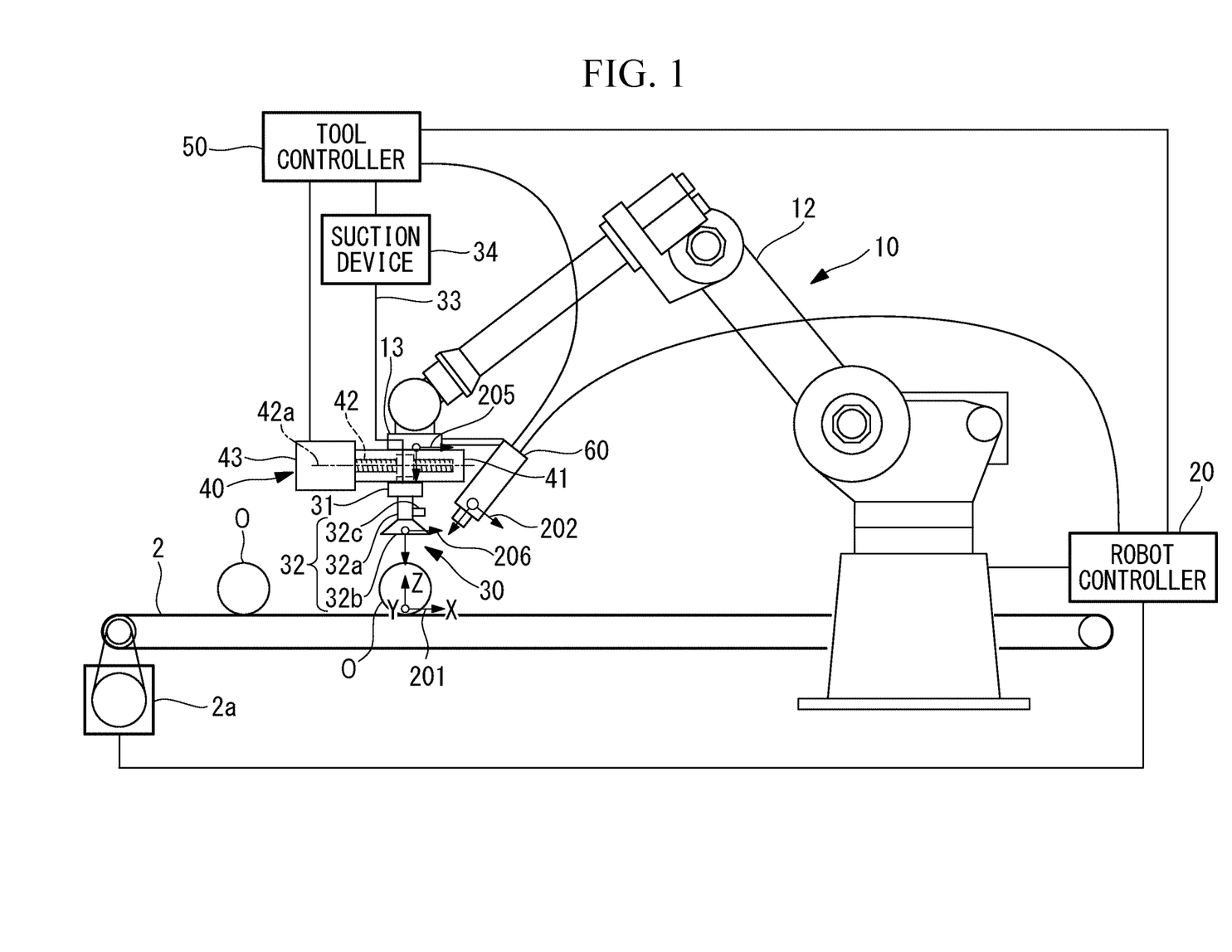
FIG. 1 is a diagram showing a configuration of a robot system according to an embodiment of the present invention.

As shown in FIG. 1, the robot system according to this embodiment includes a conveyer device (a moving means) 2 which is driven by a motor 2a and which transports an object O which is an article, a robot 10 which performs a predetermined operation on the object O which is moved by means of the conveyer device 2, a robot controller 20 which belongs to the robot 10, a tool 30 which is provided at a distal end portion of the robot 10, and a sensor 60 which detects at least a position of the object O which is being moved by means of the conveyer device 2. In this embodiment, a transportation direction of the conveyer device 2 and a X-axis direction of a reference coordinate system 201 of FIG. 1 correspond with each other, a vertical direction and a Z-axis direction of the reference coordinate system 201 of FIG. 1 correspond with each other, and a Y-axis direction of the reference coordinate system 201 of FIG. 1 is taken so as to correspond with a width direction of the conveyer device 2.

The sensor 60 is a two-dimensional camera, a three-dimensional camera, a three-dimensional distance sensor, and the like, and it is also possible to use other cameras which are capable of obtaining data for detecting the position of the object O. The sensor 60 according to the present embodiment is the two-dimensional camera, and the sensor 60 is attached to the distal end portion of the robot 10. The sensor 60 includes a processor 61, a RAM 62, and a memory 63 storing an image processing program 63a. The processor 61 performs, for example, blob detection processing for detecting the object O by using image processing, such as pattern matching processing, binarization processing and the like, and processing for detecting a position of the center of the gravity, a position of a feature point, and the like of the detected object O. Data of the sensor 60 is sent to the robot controller 20 and a tool controller 50 which is described below. A control cycle of the processor 61 is shorter than that of the robot control unit 21 of the robot controller 20, and the control cycle of the processor 61 is, for example, one millisecond. It is also possible to make the control cycle further shorter as the frame rate of the sensor 60 is improved.

Figure 3:
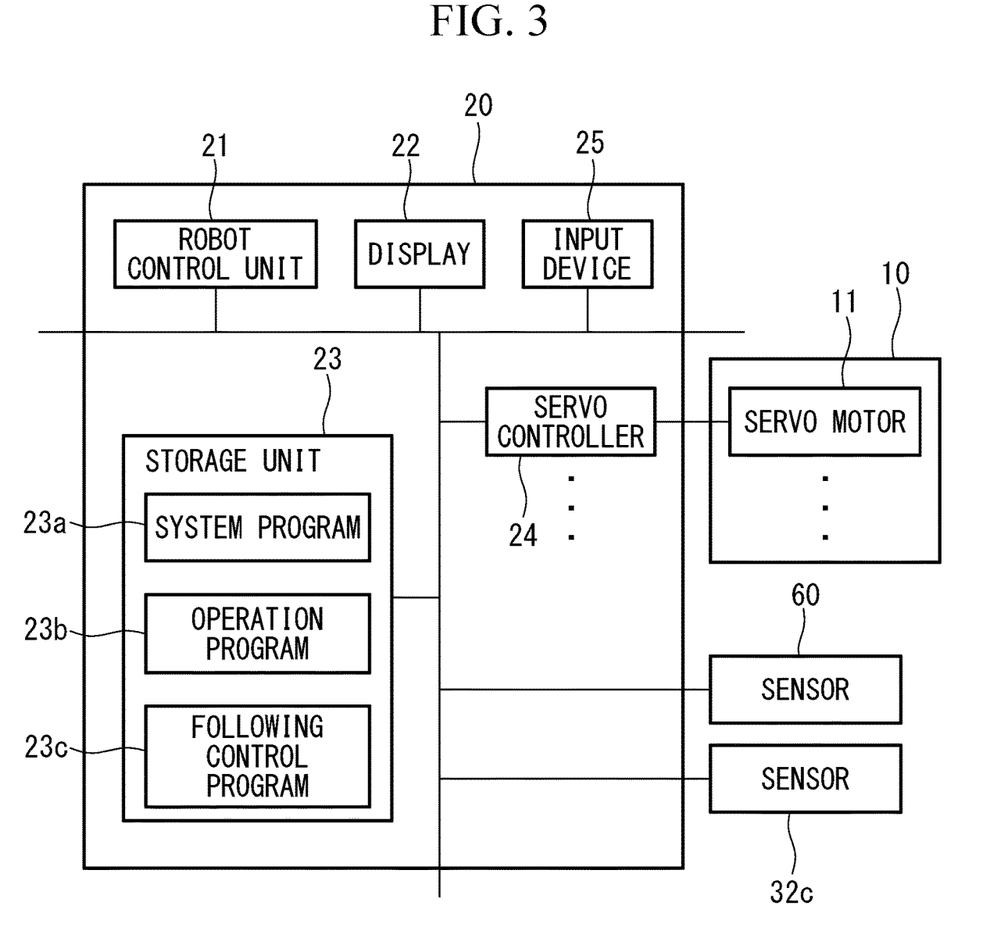
FIG. 3 is a block diagram of a robot controller of the robot system of the embodiment.

The robot 10 is not limited to a specific type of robot, however, the robot 10 in accordance with this embodiment includes a plurality of servo motors 11 for respectively driving a plurality of movable portions (refer to FIG. 3). Also, an arm 12 of the robot 10 is configured by the plurality of the movable portions. Each of the servo motors 11 has an operation position detection device for detecting an operation position of each of the servo motors 11, and one example of the operation position detection device is an encoder. Detected values of the operation position detection devices are sent to the robot controller 20.

At the time of setting the reference coordinate system 201 of the robot controller 20, a setting tool which is temporarily provided at the distal end portion of the robot 10 touches a plurality of predetermined places of a calibration jig which is set at a certain position on the conveyer device 2. In this embodiment, a position of the reference coordinate system 201, in other words, the origin is a predetermined position on the calibration jig.

Also, it is possible to use other jigs instead of the calibration jig at the time of setting the reference coordinate system 201.

And, it may be possible to set the reference coordinate system 201 by measuring the predetermined position indirectly by using a position measurement tool without touching the calibration jig directly by the setting tool.

Also, in the robot controller 20, the reference coordinate system 201 and a current position and orientation of the sensor 60 (a sensor coordinate system 202) are correlated with each other. For example, after the position of the calibration jig which is seen from the reference coordinate system 201 is calculated by touching the predetermined places of the calibration jig by means of the setting tool, which is temporarily provided at the distal end portion of the robot 10, the sensor 60 detects images, the position of the feature point, and the like of the calibration jig so as to set an attachment position and orientation of a camera on the robot 10 (the sensor coordinate system 202). This is also equivalent to obtaining a position relationship between a distal end coordinate system 205 of the robot and the sensor coordinate system 202. Further, adjustment parameters for removing distortion of a lens and the like are also obtained.

By this, even in such a case where the position of the robot 10 is changed, the robot controller 20 can know the position and the orientation of the sensor 60, and can precisely convert the detected results which are obtained by the sensor 60 to results which are seen from the reference coordinate system 201.

Moreover, in at least one of the robot controller 20 and the tool controller 50 which is described below, the robot 10 (the reference coordinate system 201) and a position and orientation of a tool main body 32 of the tool 30 (a tool distal end coordinate system 206) are correlated with each other. In order to achieve this correlation, for example, in a state where the tool 30 has been stopped at a predetermined position, a position and orientation of a distal end portion of the tool main body 32 (the tool distal end coordinate system 206), which is placed at a certain position with regard to the distal end portion of the robot 10, is obtained in the robot controller 20. In this case, for example, the tool controller 50, which is described below, obtains the current position of the tool distal end coordinate system 206 from the robot controller 20, and calculates a position of the distal end of the tool main body 32, which is seen from the reference coordinate system 201, by using operation amount of the tool main body 32 in the tool 30 as well. For example, in such a case where the robot controller 20 is capable of calculating the current position of the tool distal end coordinate system 206 at every one millisecond from the detected results of the respective operation position detection devices, the tool controller 50 is also capable of calculating the position of the distal end of the tool main body 32 at every one millisecond. Also, it may be possible that the tool controller 50 refers to the detected results of the respective operation position detection devices at every one millisecond so as to calculate the position of the distal end of the tool main body 32. This is equivalent to calculating the position of the tool distal end coordinate system 206, which is seen from the reference coordinate system 201, by using the operation amount and the current position of the tool distal end coordinate system 206. Therefore, the tool controller 50 is capable of controlling the position of the tool distal end coordinate system 206 so that the position of the tool distal end coordinate system 206 gets closer to a target position in the reference coordinate system 201.

In addition, the robot controller 20 is also capable of obtaining the operation amount of the tool main body 32 from the tool controller 50, and the robot controller 20 is capable of calculating, with a long control cycle, the current position of the tool distal end coordinate system 206.

By this, the robot controller 20 is capable of controlling the robot 10 so that the tool distal end coordinate system 206 gets closer to the target position with the long control cycle.

A tool 30 is attached to the distal end portion of the arm 12 of the robot 10 via a tool moving device 40, and the tool moving device 40 and the tool 30 are controlled by the tool controller 50.

The tool moving device 40 includes a moving device main body 41 which is fixed to the distal end portion of the arm 12, a ball screw 42 which is rotatably supported by the moving device main body 41, and a motor 43, such as a servo motor and the like, which is supported by the moving device main body 41, and which rotates the ball screw 42. In this embodiment, a central axis line 42a of the ball screw 42 is not parallel with a central axis line 13a of a flange member 13 which is a movable portion located at the most distal end side of the arm 12, however, in this embodiment, the central axis line 42a of the ball screw 42 extends toward a direction which is different by approximately 90 degrees from the central axis line 13a. The servo motor 43 has an operation position detection device for detecting an operation position thereof, and detected values of the operation position detection device are sent to the tool controller 50.

The tool 30 includes a slider 31 which is supported by the moving device main body 41 so as to be movable toward a direction along the central axis line 42a, and a tool main body 32 which is supported by the slider 31. In this embodiment, the tool main body 32 supports the object O by sucking the object O, and the tool main body 32 includes a base portion 32a which is fixed to the slider 31, a sucking portion 32b which has a sucker shape, and which is provided at a lower end of a base portion 32a, and a sensor 32c which is a pressure sensor and the like, and which detects suction of the object O by the sucking portion 32b. The detected results of the sensor 32c are sent to the robot controller 20 as well. The sucking portion 32b is, for example, made of a material having rubber-like elasticity. An inner space of the base member 32a is connected to a suction device 34 through a pipe 33, and the inner space of the base member 32a communicates in a concave portion of the sucking portion 32b. And therefore, when the air is sucked by the suction device 34 in a state where the sucking portion 32b is touching an upper surface of the object O, the object O is supported by the tool main body 32.

Figure 2:
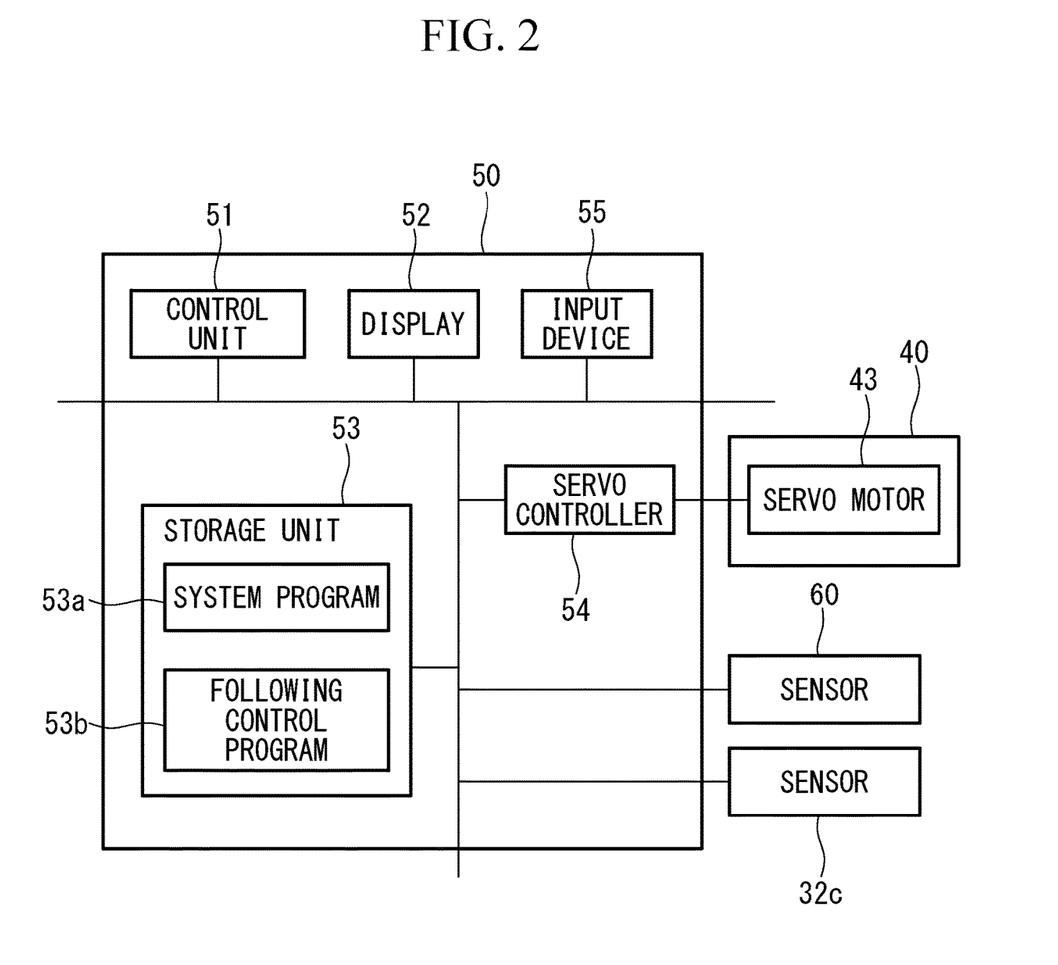
FIG. 2 is a block diagram of a tool controller of the robot system of the embodiment.

As shown in FIG. 2, the tool controller 50 includes a control unit 51 having a CPU, a RAM and the like, a display 52, a storage unit 53 having a non-volatile storage, a ROM, and the like, a servo controller 54 which controls the motor 43 of the tool moving device 40, and an input device 55. The tool controller 50 receives the detected results of the sensor 60 in every control cycle of the sensor 60 (one millisecond), and the tool controller 50 controls the motor 43 of the tool moving device 40, and the suction device 43 of the tool 30 as well with a control cycle (a control cycle of the tool) which is the same as or close to that of the sensor 60.

A system program 53a is stored in the storage unit 53, and the system program 53a provides a basic function of the tool controller 50. Also, a following control program 53b is stored in the storage unit 53.

As shown in FIG. 3, the robot controller 20 includes a robot control unit 21 having a processor, a RAM, and the like, a display 22, a storage unit 23 having a non-volatile storage, a ROM, and the like, a plurality of servo controllers 24 which respectively correspond to the servo motors 11 of the robot 10, and an input device 25 which is a touch panel and the like. A control cycle of the robot controller 20 is, for example, ten milliseconds, which is longer than that of the sensor 60 and that of the tool controller 50. Also, the control which is performed by the robot controller 20, and which moves the arm 12 to a target position is complicated because the control includes decisions for making a suitable route, calculation of a driving amount and driving speed of the respective servo motors 11 in response to the route, and the like, and therefore, a cost for making the control cycle of the robot controller 20 shorter is not reasonable.

A system program 23*a* is stored in the storage unit 23, and the system program 23*a* provides a basic function of the robot controller 20. Also, an operation program 23*b* and a following control program 23*c* are stored in the storage unit 23. The robot controller 20 controls each of the servo motors 11 of the robot 10, and the tool controller 50 controls the tool moving device 40 and the tool 30, and by this, a pick up operation of the object O which is being moved by means of the conveyer device 2 is performed.

Figure 4:
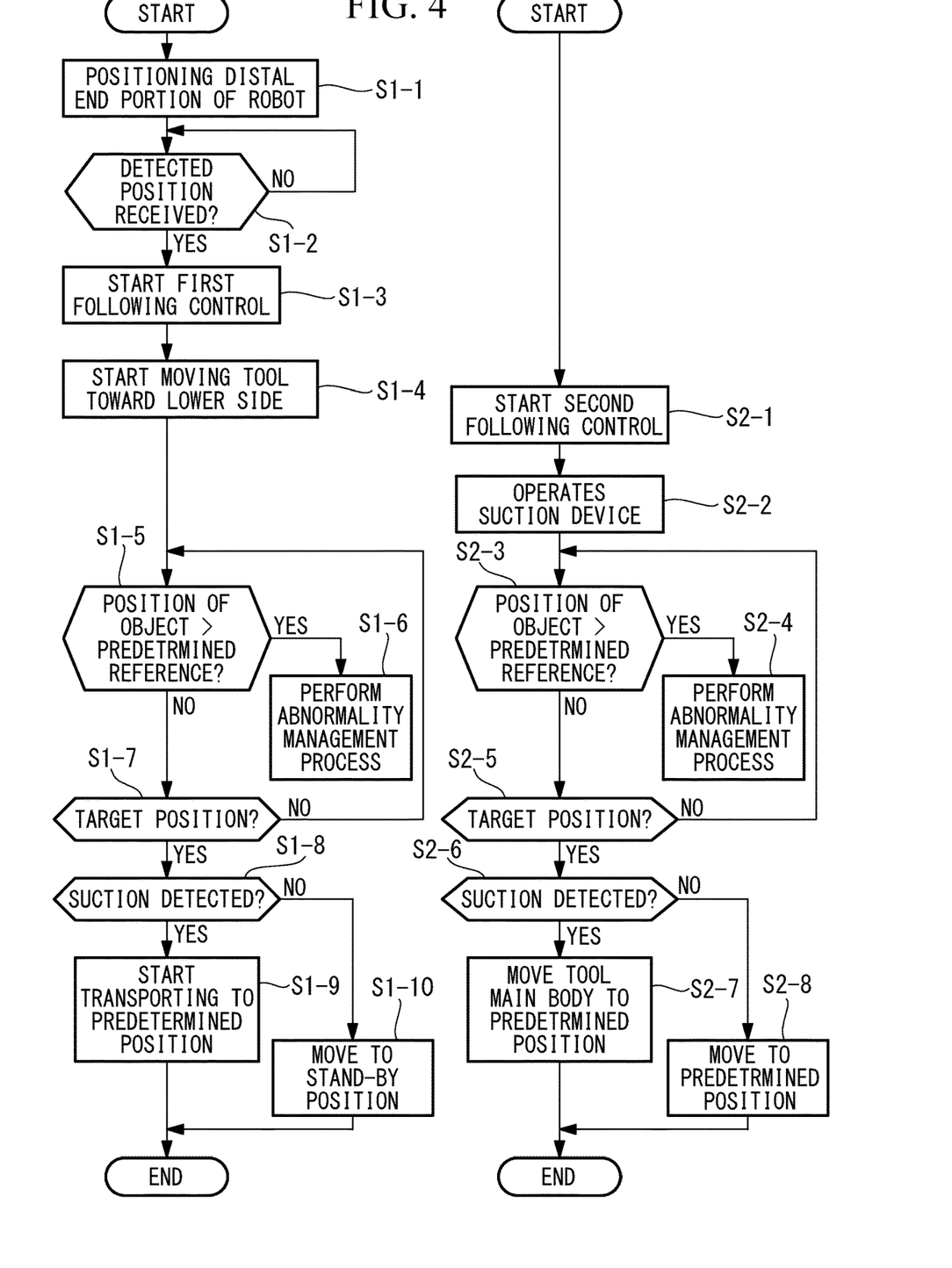
FIG. 4 is a flow chart showing an example of processes of the robot controller and the tool controller of the embodiment.

A process of the robot control unit 21 on the basis of the operation program 23*b* and the following control program 23*c* at the time of executing the operation, and a process of the controller 51 on the basis of the following control program 53*b* are described, referring to the flowchart shown in FIG. 4.

Firstly, the robot control unit 21 places the distal end portion of the robot 10 at a predetermined position which is located at the upper side of the conveyer device 2 (Step S1-1). The position of the sensor 60 at the time when the distal end portion of the robot 10 is placed as described above is a position where the object O, which is being moved by the conveyer device 2, is located within an angle of view of the sensor 60.

Subsequently, when the robot controller 20 receives the detected positions of the object O from the sensor 60 (Step S1-2), on the basis of the detected positions of the object O, the robot control unit 21 starts first following control in which the robot 10 is controlled so as to make the position of the X-axis direction and that of the Y-axis direction of the tool main body 32 follow the object O while getting the position of the too main body 33 in the X-axis direction and that in the Y-axis direction closer to the position of the object O (Step S1-3). At this time, the central axis line 42*a* of the ball screw 42 of the tool moving device 40 is parallel to the X-axis.

There are many kinds of control methods for achieving the first following control, and for example, it is possible to use the following two control methods. In this embodiment, the former control method is called image-based method, and the latter one is called position-based method. According to this embodiment, in the two control methods, the sensor 60 detects the position and the orientation of the object O, however, the position and the orientation of the object O may be detected by the robot controller 20 or the tool controller 50 on the basis of data which is obtained by the sensor 60.

In the control using the image-based method, the robot 10 is controlled so that a characteristic shape, a feature point, the position of the graphic center, and the like of the object O are always positioned at a predetermined position within the angle of view of the sensor 60 which is attached at the distal end portion of the robot 10, and this makes the sensor 60 follow the object O, and the position of the reference coordinate system 201 is also moved in accordance with the position of the sensor 60 at the time of following the object O or the position of the distal end portion of the robot 10. And therefore, the set position of the reference coordinate system 201 moves sequentially as the object O moves, and the robot 10 performs the operations while following the object O by the operation program 23*b* which is taught with reference to the reference coordinate system 201.

Whereas, in the control using the position-based methods, the robot 10 is controlled by sequentially detecting the positions of the object O in the reference coordinate system 201 from the data which is obtained from the sensor 60, and by calculating a correction amount so that the position of the object O gets closer to the target position which is on the basis of the detected positions.

Also, in Step S1-3, depending on types of the operations of the robot 10, there is a case where the robot 10 moves the tool 30 in the X-axis direction at constant speed, and there is also a case where the robot 10 places the tool 30 at a predetermined position.

On the basis of the operation program 23*b*, the robot control unit 21 starts moving the distal end portion of the robot 10 toward the lower side so that the sucking portion 32*b* of the tool main body 32 comes into contact with the upper surface of the object O (Step S1-4). Also, when the distal end portion of the robot 10 is moving toward the lower side, the controller 51 starts second following control, in which the position of the tool main body 32 in the X-axis direction is made to follow the detected positions on the basis of the detected positions of the object O which are received from the sensor 60 (Step S2-1). And, the robot control unit 21 or the controller 51 operates the suction device 34 (Step S2-2). Also, Step S2-2 should be performed before the tool main body is placed at the target position in Step S2-5 which is described below.

There are many kinds of control methods for achieving the second following control, and for example, the second following control is performed by using the following method. The following method is control which is performed on the basis of the detected positions of the object O in the reference coordinate system 201, and therefore, it is called position-based method in this embodiment.

On the presupposition of this process, the reference coordinate system 201 of the robot 10 and the sensor coordinate system 202, which shows the position and the orientation of the sensor 60, are correlated with each other as described above, and it is possible that the position and the orientation of the sensor 60, which are recognized by the robot controller 20, can sequentially be referred from the tool controller 50.

The controller 51 sequentially calculates the position of the object O in the reference coordinate system 201 on the basis of the detected position of the object O, which is detected by the sensor 60, and the position and the orientation of the sensor 60, the controller 51 controls the servo motor 43 so as to get closer to the target position which is on the basis of the calculated portion, and by this, the position of the tool 30 is made to follow the object in the X-axis direction.

In addition, needless to say, it is also possible to perform Step S2-1 by using other control method than the above described method.

Here, when the position of the object O with regard to the sensor 60 is changed beyond a predetermined reference (Step S1-5), the robot control unit 21 performs an abnormality management process (Step S1-6). The change which is beyond the predetermined reference means large movement of the object O in the image data, movement of the object O in the image data which is faster than a predetermined speed, disappearance of the object O at unintended timing, and the like. There is a case where the power supply is not stable, a case where rotation speed of the motor of the conveyer device 2 is suddenly reduced, and also a case where the rotation speed of the motor is drastically changed. In these cases, the position of the object O with regard to the sensor 60 is changed beyond the predetermined reference.

As the abnormality management process, the robot 21 performs control which stops the sucking operation of the object O, control which evacuates the robot 10, control which stops the conveyer device 2, or control which combines the above.

In this embodiment, when the position of the object O with regard to the sensor 60 is changed beyond a predetermined reference (Step S2-3), the controller 51 also performs the abnormality management process on the tool side (Step S2-4). As the abnormality management process on the tool side, the controller 51 performs control which stops the movement of the tool 30, control which moves the tool 30 toward a direction which is distant from the object O, control which moves the tool 30 to a predetermined position, and the like.

Next, the distal end portion of the robot 10 is placed at the target position by virtue of the control of Steps S1-3 and S1-4 (Step S1-7), and at that time, in a state where the tool main body 32 is placed at the target position by virtue of the control of Step S2-1 (Step S2-5), the sucking portion 32b of the tool main body 32 comes into contact with the upper surface of the object O, and when a sensor 32c detects that the sucking portion 32b sucks the object O (Step S1-8, S2-6), the controller 51 terminates the following control of Step S2-1, and moves the tool main body 32 to the predetermined position (Step S2-7), and the robot control unit 21 starts moving the object O, which is held by the tool 30, to the predetermined position (Step S1-9). On the other hand, in such a case where the suction of the sucking portion 32b is not detected in Step S1-8, the robot control unit 21 moves the robot 10 to a standby position (Step S1-10), and the controller 51 moves the tool main body 32 to the predetermined position (Step S2-8).

Also, the transportation by means of the robot 10 may be performed by taking the operation amount of the tool 30 into account without moving the tool main body 32 to the predetermined position in step S2-7 (Step S1-9).

As described above, the robot system and the robot 10 according to this embodiment includes the sensor 60 which detects the object O which is being moved by the conveyer device 2, and the tool 30 which is attached at the distal end of the arm 12 of the robot 10. In this embodiment, the tool moving device 40, which moves the tool main body 32 of the tool 30 with regard to the robot 10, is controlled in a tool control cycle which is shorter than the control cycle of the robot 10.

For example, the object O is irregularly shaking on the conveyer device 2, and when a cycle of such changing movement is shorter than the control cycle of the robot 10, it is not possible to match the movement of the robot 10 with the object O. And therefore, the robot 10 can move the tool 30 to an approximate position where the object O exists, however, the robot 10 cannot highly precisely match the position of the tool 30 with the movement of the object O. In this embodiment, the tool 30 which is attached to the robot 10 is controlled by the controller 51 in the tool control cycle, and the tool control cycle is shorter than the control cycle of the robot 10. Therefore, it is possible to make the position of the tool main body 32 of the tool 30 highly precisely follow the object O being conveyed by the conveyer device 2 without making the control cycle of the robot 10 shorter.

Also, in this embodiment, the sensor 60 detects the object O in a cycle which is shorter than the control cycle of the robot 10, and the robot controller 20 which controls the robot 10 uses the data which is sequentially received from the sensor 60 in every cycle which is longer than the control cycle of the tool so as to control the robot 10.

And therefore, the robot controller 20 performs the control in the control cycle which is longer than the control cycle of the tool without requiring the sensor 60 to separately create data for controlling the tool and data for controlling the robot.

Also, in this embodiment, in such a case where the position of the object O, which is detected by the sensor 60, is changed beyond a predetermined reference, at least one of the robot 10 and the tool 30 performs the abnormality management process. This configuration is advantageous for certainly achieving the prevention of the robot 10, the tool 30, the conveyer device 2, the object O, and the like from getting damaged.

The robot system according to a second embodiment of the present invention will be described below with reference to the accompanying drawings.

Figure 5:
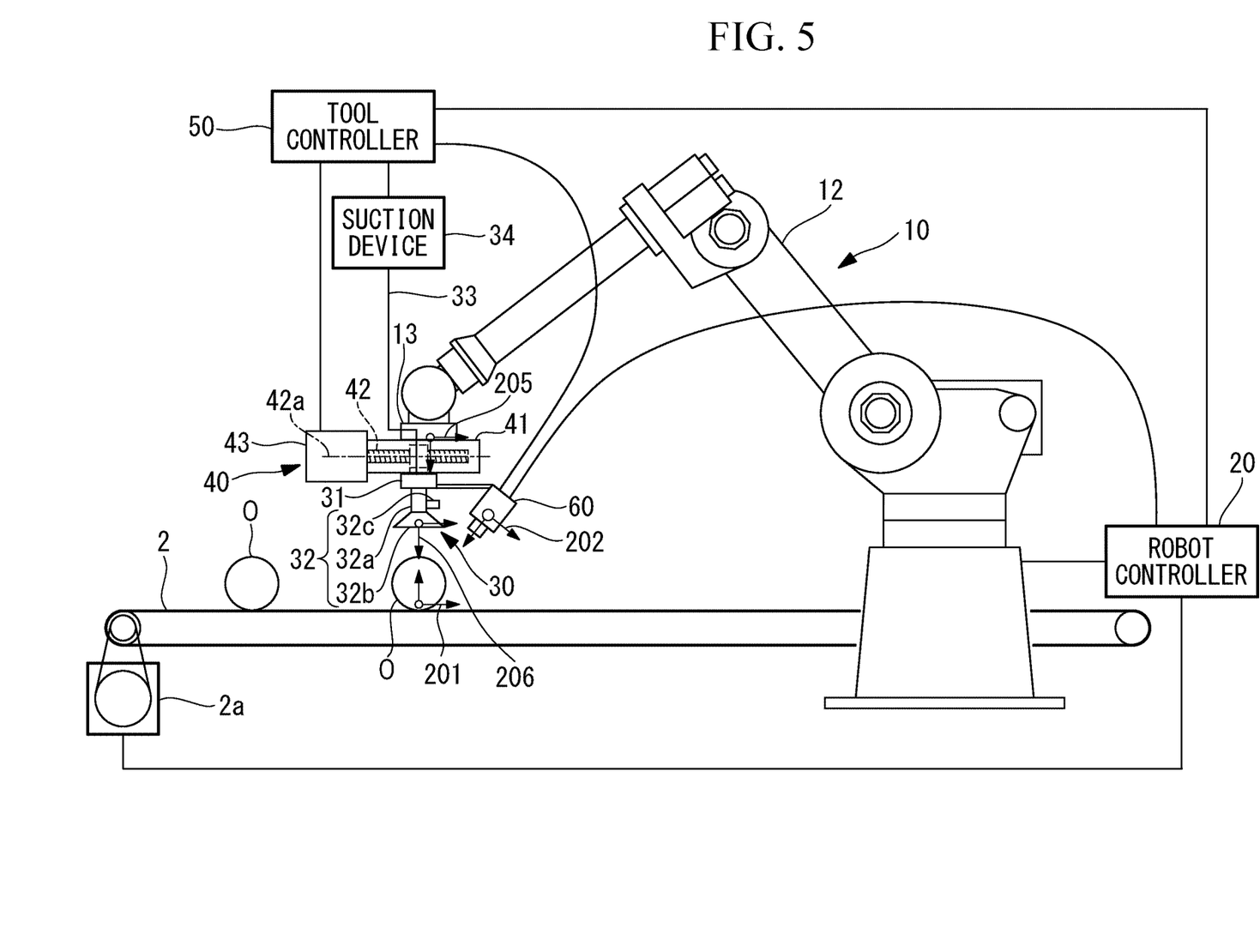
FIG. 5 is a diagram showing a configuration of a robot system according to a second embodiment of the present invention.

As shown in FIG. 5, in the robot system according to the second embodiment, an attachment position of the sensor 60 is different from the first embodiment. Specifically, in the second embodiment, the sensor 60 is fixed to the slider 31 or the tool main body 32, and the sensor 60 is moved together with the tool 30 by means of the tool moving device 40. The robot system according to the second embodiment also uses the robot 10, the robot controller 20, the tool 30, the tool moving device 40, the tool controller 50, and the sensor 60, which are similar to or the same as those of the first embodiment.

In the second embodiment, in the tool controller 50 or the robot controller 20, the attachment position and orientation of the sensor 60 (the sensor coordinate system 202) and a position and orientation of the tool 30 (a tool distal end coordinate system 206) are correlated with each other beforehand.

A current position of the sensor 60 which is seen from the reference coordinate system 201 of the robot controller 20 can be obtained by taking the operation amount of the tool main body 32 into account.

In the second embodiment also, at the time of executing the picking operation of the object O, a process of the robot control unit 21 on the basis of the operation program 23b and the following control program 23c, and a process of the controller 51 on the basis of the following program 53b are performed in accordance with the flow chart shown in FIG. 4. However, the second following control in Step S2-1 is performed by the following two methods, for example. In this embodiment, the former is called image-based method, and the latter is called position-based method. Needless to say, it is also possible to perform Step S2-1 by using other control methods than the above described methods.

On the presupposition of the following two processes, as described above, the tool controller 50 is capable of sequentially calculating the position of the tool main body 32 in the reference coordinate system 201 on the basis of the position and the orientation of the tool main body 32 which is recognized by the robot controller 20, and the operation amount of the tool main body 32. Also, the tool distal end coordinate system 206 which shows the position and the orientation of the tool 30 and the sensor coordinate system 202 which shows the position and the orientation of the sensor 60 are correlated with each other. That is to say, the tool controller 50 recognizes the position and the orientation of the sensor 60 in the reference coordinate system 201.

In the control using the image-based method, the controller 51 controls the motor 43 so that a specific position of the object O, such as the position of the graphic center and the like, is always placed at a predestined position within the angle of view of the sensor 60, and by this, the sensor 60 is made to follow the object O in the X-axis direction. With this following control, the tool main body 32, of which position with regard to the sensor 60 is fixed, is made to follow the object O.

In the control using the position-based method, the controller 51 sequentially calculates the position of the object O in the reference coordinate system 201 on the basis of the detected position of the object O, which is detected by the sensor 60, and the position and the orientation of the sensor 60 with regard to the tool 30. And, on the basis of the calculated position, the object O is made to follow the position of the tool 30 in the X-axis direction.

In the second embodiment also, the tool 30 which is attached to the robot 10 is controlled by the controller 51 in the tool control cycle, and the tool control cycle is shorter than the control cycle of the robot 10. Therefore, it is possible to obtain the same effect as the first embodiment.

Also, in the second embodiment, the sensor 60 is moved together with the tool main body 32 of the tool 30 so that the position of the tool main body 32 with regard to the sensor 60 is fixed. Therefore, the movement of the tool main body 32 is directly detected by the sensor 60, and the position of the object O with regard to the sensor 60 is directly related to the position of the object O with regard to the tool main body 32. This is advantageous for achieving precise control, accelerating the control, simplifying the control, and the like.

A robot system according to a third embodiment of the present invention will be described below with reference to the accompanying drawings.

Figure 6:
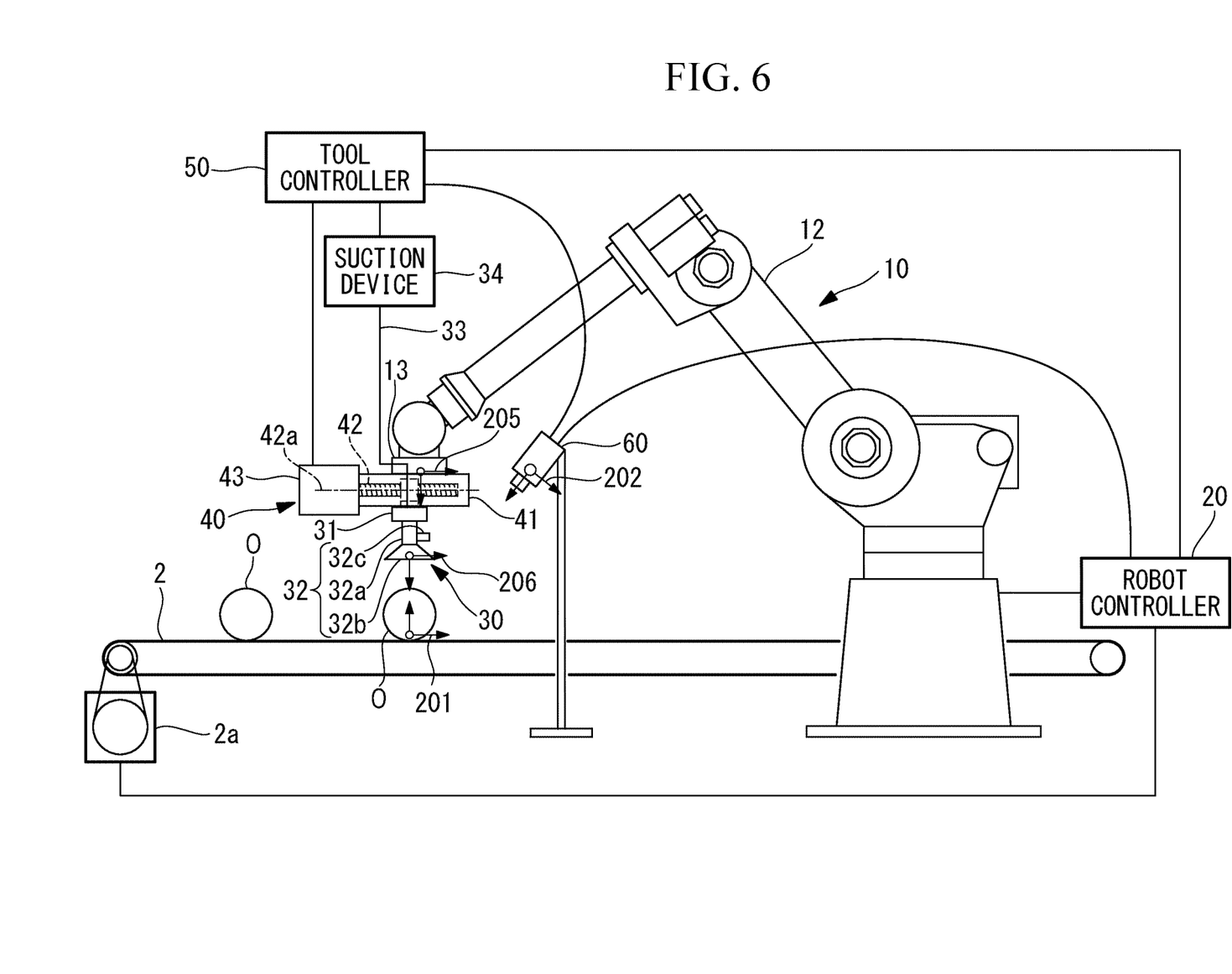
FIG. 6 is a diagram showing a configuration of a robot system according to a third embodiment of the present invention.

As shown in FIG. 6, in the robot system according to the third embodiment, an attachment position of the sensor 60 is different from the first embodiment. Specifically, in the third embodiment, the sensor 60 is fixed to a predetermined position by means of a stand, a frame, and the like. The robot system according to the third embodiment also uses the robot 10, the robot controller 20, the tool 30, the tool moving device 40, the tool controller 50, and the sensor 60, which are similar to or the same as those of the first embodiment.

In the third embodiment, in the robot controller 20, the reference coordinate system 201 and the position and the orientation of the sensor 60 (the sensor coordinate system 202) are correlated with each other beforehand.

In the third embodiment also, at the time of executing the picking operation of the object O, the process of the robot control unit 21 on the basis of the operation program 23*b* and the following control program 23*c*, and the process of the controller 51 on the basis of the following program 53*b* are performed in accordance with the flow chart shown in FIG. 4. However, the first following control in Step S1-3 is the position-based control method, the distal end portion of the robot 10 is placed at a predetermined position which is for preparation for picking the object O in Step S1-1. Moreover, the following control in Step S2-1 is performed by using the following method, for example. The following method is the control which is performed on the basis of the detected positions of the object O in the reference coordinate system 201, and therefore, it is called position-based method in this embodiment. Needless to say, it is also possible to perform Step S2-1 by using other control methods than the above described method.

On the presupposition of this process, as described above, the reference coordinate system 201 of the robot 10 and the sensor coordinate system 202, which shows the position and the orientation of the sensor 60, are correlated with each other. Also, the tool controller 50 is capable of sequentially calculating the position and the orientation of the tool main body 32 from the position of the tool 30, which is seen from the reference coordinate system 201, and the operation amount of the tool main body 32. In the tool controller 50, the position and the orientation of the tool main body 32 is correlated with the reference coordinate system 201.

The controller 51 sequentially calculates the position of the object O in the reference coordinate system 201 on the basis of the detected position of the object O which is detected by the sensor 60 and the position and the orientation of the sensor 60 so as to make the position of the tool main body 32 follow the calculated position in the X-axis direction.

In the third embodiment also, the tool 30, which is attached to the robot 10, is controlled by the controller 51 in the tool control cycle, and the tool control cycle is shorter than the control cycle of the robot 10. And therefore, it is possible to obtain the same effect as the first embodiment.

Also, in the first to the third embodiments, the blob processing, the image processing such as pattern matching processing, the processing for detecting the position of the graphic center, and the like with regard to the detected results of the sensor 60 may be performed by the robot controller 20, the tool controller 50, or the other computer, and the like.

For example, the sensor 60 sends the images to the robot controller 20, which is capable of processing the images in a long cycle, and the robot controller 20 performs the pattern matching which uses outline of the object O, and detects the accurate position or the orientation of the object O. And, the robot controller 20 may control the robot 10 so as to get closer to the object O on the basis of the detected results. At this time, the sensor 60 receives the detected results, and sends sensing data to the tool controller 50 which requires to process the sensing data in a short cycle, and the tool controller 50 may move the tool main body 32. The sensing data is obtained by executing the blob processing, the image processing such as the pattern matching processing and the like, the detection of the center of the gravity, and the like, and a processing range thereof is narrowed down to a range which is at a surrounding of the detected positions of the object O in the detected images.

Also, in the first to the third embodiments, it may be possible that the robot controller 20, the sensor 60, or other computer, and the like provides a part of functions or the entire functions of the tool controller 50.

Moreover, in the first to the third embodiments, the operation target is set to be the detection target, however, other target can be the detection target as long as the other target can stably keep the relative relation with the operation target.

In addition, the sensor 60, the robot controller 20, and the tool controller 50 are respectively connected to a host controller, and the detected results, settings, calculation results, and the like of the sensor 60, the robot controller 20, and the tool controller 50 may be transmitted and received via the host controller.

And, the tool main body 32 may be other known tool, such as a cutting tool for executing a predetermined cutting which is a machine cutting process and the like, a welding tool, a painting tool, a cleaning tool, a measurement tool including a close-up camera and a non-contact type thermometer, every kind of sensor, assembly tool including a nut runner, and the like, and it is possible that the object O may be a variety of kinds of goods such as a vehicle body, an assembling target portion or a cutting target portion such as a hole and the like which is provided at the vehicle body, a frame, a component, a semi-finished product, a food, medical supplies, and the like.

Also, in the first to the third embodiments, the tool main body 32 includes a sucking portion moving device which moves the sucking portion 32b toward the X-axis direction by means of the motor, and the tool controller 50 may control the sucking portion moving device by using the detected positions of the object O which is detected by the sensor 60.

And, in the first to the third embodiments, in such a case where the tool main body 32 is a hand which grips the object O by means of a plurality of fingers, the tool controller 50 may control each of the fingers of the hand by using the detected positions of the object O which is detected by the sensor 60. In these cases, the same effect as described above can be obtained without having the tool moving device 40.

Moreover, in the first to the third embodiments, only a flange member 13, which is located at the most distal end side (an arm member driven about a final axis) among the plurality of the arm members configuring the arm 12 of the robot 10, is set so that the flange member 13 can move at high speed, the tool controller 51 is integrated in the robot controller 20, and the arm member which is located at the most distal end is controlled in the control cycle which is shorter than the control cycle of the robot 10, and therefore, the same effect as described above can be obtained. In addition, an arm member which is the second closest to the distal end side may also be controlled by the control cycle of the tool in the same manner.

And, in the first to the third embodiments, other robot may transport the object O instead of the conveyer device 2. In this case also, the same effect as described above can be obtained. Moreover, in such a case where the object O is an automobile, a body of the automobile, which is the object O on which a predetermined operation is performed, may be moved by its engine, wheels, and the like. In these cases, the other robot, the engine, the wheels, and the like provide a function as the moving means.

In the first to the third embodiments, a shooter, from which the object O slides of, rolls down, or falls off due to the gravity force, may transport the object O instead of the conveyer device 2. In this case, it is also possible to vibrate the shooter, which is inclined, by means of a vibrator so as to allow smooth transportation of the object O on the shooter. In these cases, the shooter, the vibrator, and the like provide a function as the moving means, and the object O which is moved by the shooter is picked up by the tool main body 32 which is attached to the robot 10.

Also, in the first to the third embodiment, the tool moving device 40 includes a X-axis direction actuator having the motor 43 and the bass screw 42 in order to move the tool main body 32 to the X-axis direction. Whereas, the tool moving device 40 further includes a Y-axis direction actuator which is similar to the X-axis direction actuator, and the tool controller 50 may control the X-axis direction actuator and the Y-axis direction actuator by using the detected positions of the object O which is detected by the sensor 60. In this case, it is possible to make the object O highly precisely follow the position of the tool main body 32 in the X-axis direction and the Y-axis direction. The tool moving device 40 may further includes a Z-axis direction actuator, a rotation direction actuator, and the like.

The following aspects are derived from the above disclosure.

A robot system according to a first aspect of the present invention includes a sensor which obtains data for detecting at least a position of an object which is being moved by a moving means for moving the object; a robot to which a tool is attached, and which performs a predetermined operation for the object by using the tool; and a controller which controls, using the data, a tool moving device which moves the tool with regard to the robot, the tool, or an arm member which is located at a distal end side of an arm of the robot with a tool control cycle which is shorter than a control cycle of the robot.

For example, in such a case where the object is irregularly shaking on the moving means, and a change cycle of the movement is shorter than the control cycle of the robot, it is not possible to match the movement of the robot with the object. It is similar to the case where movements which can be recognized by eyes or a brain of human are limited. Therefore, the robot is capable of moving the tool to an approximate position where the object exists, however, it is not possible to highly precisely match the position of the tool with the movement of the object. In the above aspect, the tool which is attached to the robot is controlled by the controller in the tool control cycle, and the control cycle of the tool is shorter than the control cycle of the robot. Therefore, it is possible to make the tool highly precisely follow the position of the object on the moving means without making the control cycle of the robot shorter.

In the above aspect, preferably, the sensor obtains the data in a cycle which is shorter than the control cycle of the robot, and a robot controller for controlling the robot uses the data which is sequentially received from the sensor in every cycle which is longer than the tool control cycle so as to control the robot.

With this aspect, the robot controller performs the control in the control cycle which is longer than the control cycle of the tool without requiring the sensor to separately create data for controlling the tool, and data for controlling the arm.

In the above aspect, preferably, the tool moving device moves the sensor together with the tool.

In this aspect, since the sensor is moved together with the tool, a position of the tool with regard to the sensor is fixed. Therefore, it also results that the movement of the tool is directly detected by the sensor, and the position of the object with regard to the sensor is directly related with the position of the object with regard to the tool. This aspect is advantageous for achieving the accurate control, accelerating the control, simplifying the control, and the like.

In the above aspect, preferably, at least one of the robot and the tool performs an abnormality management process when a position of the object detected based on the data is changed beyond a predetermined reference.

This aspect is advantageous for certainly achieving prevention of the robot, the tool, the conveyer device, the object, and the like from getting damaged.

A second aspect of the present invention is a robot including an arm to which a tool is attached, and which performs a predetermined operation by the tool for an object which is being moved by a moving means for moving the object; a sensor which is attached to the arm or the tool, and which obtains data for detecting at least a position of the object which is being moved by the moving means; and a controller which controls, using the data, a tool moving device which moves the tool with regard to the arm, the tool, or an arm member which is located at a distal end side of the arm with a tool control cycle which is shorter than a control cycle of the robot.

In this aspect, the tool attached to the arm is controlled by the controller with the tool control cycle, and the tool control cycle is shorter than a control cycle of the arm. And therefore, it is possible to make the tool highly precisely follow the position of the object on the moving means without making the control cycle of the robot shorter.

With the above aspect, preferably, the sensor obtains the data in a cycle which is shorter than the control cycle of the robot, and the robot controller for controlling the robot uses the data which is sequentially received from the sensor in every cycle which is longer than the tool control cycle so as to control the robot.

With this aspect, the robot controller performs the control in the control cycle which is longer than the tool control cycle without requiring the sensor to separately create the data for controlling the tool and the data for controlling the arm.

In the above aspect, preferably, the tool moving device moves the sensor together with the tool.

In this aspect, since the sensor is moved together with the tool, the position of the tool with regard to the sensor is fixed. And therefore, it also results that the movement of the tool is directly detected by the sensor, and the position of the object with regard to the sensor is directly related with the position of the object with regard to the tool. This aspect is advantageous for achieving the accurate control, accelerating the control, simplifying the control, and the like.

According to the above aspects, it is possible to make a position of the tool to follow an object on a conveyer device without making a control cycle of a robot unreasonably short.

REFERENCE SIGNS LIST 2 conveyer device (a moving means)
2a motor
10 robot
11 servo motors
12 arm
13 flange member
20 robot controller
21 robot controller
23 storage unit
23a system program
23b operation program
30 tool
31 slider
32 tool main body
32a base portion
32b sucking portion
32c sensor
33 pipe
34 suction device
40 tool moving device
41 moving device main body
42 ball screw
43 motor
50 tool controller
51 controller
53 storage unit
53a system program
53b following control program
60 sensor
61 processor
62 RAM
63 memory
O object

The invention claimed is:

1. A robot system comprising:
   a sensor configured to obtain data for detecting at least a position of an object which is being moved by a moving means for moving the object, wherein the sensor obtains the data in a sensor cycle;
   a robot to which a tool is attached, and which is configured to perform a predetermined operation for the object by using the tool;
   a robot controller for controlling the robot, wherein the robot controller is configured to use the data which is sequentially received from the sensor in a robot control cycle so as to control the robot; and
   a tool controller which is configured to control, using the data, a tool moving device which moves the tool with respect to the robot, the tool, or an arm member which is located at a distal end side of an arm of the robot with a tool control cycle,
   wherein the sensor cycle is shorter than or equal to the tool control cycle and the tool control cycle is shorter than the robot control cycle.

2. The robot system according to claim 1, wherein the tool moving device is configured to move the tool together with the sensor.

3. The robot system according to claim 1, wherein at least one of the robot and the tool is configured to performs an abnormality management process when a position of the object detected based on the data is changed beyond a predetermined reference.

4. A robot comprising:
   an arm to which a tool is attached, and the arm is configured to performs a predetermined operation by the tool for an object which is being moved by a moving means for moving the object;
   a sensor which is attached to the arm or the tool and is configured to obtain data for detecting at least a position of the object which is being moved by the moving means, wherein the sensor obtains the data in a sensor cycle;
   a robot controller configured to control the robot and configured to use the data which is sequentially received from the sensor; and
   a tool controller configured to control, using the data, a tool moving device which moves the tool with respect to the arm, the tool, or an arm member which is located at a distal end side of the arm with a tool control cycle,
   wherein the sensor cycle is shorter than or equal to the tool control cycle and the tool control cycle is shorter than the robot control cycle.

5. The robot according to claim 4, wherein the tool moving device is configured to move the tool together with the sensor.

* * * * *